United States Patent
Jeon et al.

(10) Patent No.: US 12,483,725 B2
(45) Date of Patent: Nov. 25, 2025

(54) METHOD FOR ENCODING AND DECODING VIDEO AND APPARATUS THEREOF

(71) Applicant: RESEARCH & BUSINESS FOUNDATION SUNGKYUNKWAN UNIVERSITY, Suwon-si (KR)

(72) Inventors: Byeung Woo Jeon, Seongnam-si (KR); Thuc Nguyen Huu, Suwon-si (KR); Jong Hoon Yim, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 0 days.

(21) Appl. No.: 18/240,086

(22) Filed: Aug. 30, 2023

(65) Prior Publication Data

US 2024/0163478 A1     May 16, 2024

(30) Foreign Application Priority Data

Aug. 31, 2022     (KR) .................. 10-2022-0109940

(51) Int. Cl.
| | |
|---|---|
| *H04N 19/597* | (2014.01) |
| *H04N 19/139* | (2014.01) |
| *H04N 19/176* | (2014.01) |
| *H04N 19/52* | (2014.01) |
| *H04N 19/53* | (2014.01) |

(52) U.S. Cl.
CPC ......... *H04N 19/597* (2014.11); *H04N 19/139* (2014.11); *H04N 19/176* (2014.11); *H04N 19/52* (2014.11); *H04N 19/53* (2014.11)

(58) Field of Classification Search
None
See application file for complete search history.

(56) References Cited

U.S. PATENT DOCUMENTS

| | | | |
|---|---|---|---|
| 2009/0022222 A1* | 1/2009 | He | H04N 19/597 375/240.12 |
| 2018/0288408 A1* | 10/2018 | Ikai | H04N 19/105 |
| 2018/0359485 A1* | 12/2018 | Liu | H04N 19/523 |
| 2021/0203945 A1* | 7/2021 | Liu | H04N 19/52 |

FOREIGN PATENT DOCUMENTS

| | | |
|---|---|---|
| JP | 2017-525188 A | 8/2017 |
| KR | 10-2020-0101803 A | 8/2020 |
| KR | 10-2020-0117017 A | 10/2020 |

OTHER PUBLICATIONS

Huu, Thuc Nguyen, Vinh Van Duong, and Byeungwoo Jeon. "Fast and efficient microlens-based motion search for plenoptic video coding." 2021 IEEE International Conference on Image Processing (ICIP). IEEE, 2021. (pp. 3258-3262).

* cited by examiner

*Primary Examiner* — Lindsay J Uhl
(74) *Attorney, Agent, or Firm* — NSIP Law

(57) ABSTRACT

A method of encoding a video according to an embodiment of the present invention comprises the steps of: calculating horizontal and vertical displacements of an image block on the basis of a unit horizontal interval and a unit vertical interval; encoding a motion vector corresponding to the image block using the horizontal and vertical displacements; and encoding the unit horizontal interval and the unit vertical interval.

15 Claims, 22 Drawing Sheets

| amvr_flag | amvr_precision_idx | AFFINE AMVP mode | Regular AMVP mode | IBC mode |
|---|---|---|---|---|
| 0 | - | 1/4 Luma sample | 1/4 Luma sample | - |
| 1 | 0 | 1/16 Luma sample | 1/2 Luma sample | 1 luma sample |
| | 1 | 1 luma sample | 1 luma sample | 4 luma sample |
| | 2 | - | 4 luma sample | - |
| | 3 | | (Px, Py) precision | |

FIG. 16

| Sequences | Cats | Dance | Train1 | Train2 | Mini-garden | Teapots | Toys | Tree | Average |
|---|---|---|---|---|---|---|---|---|---|
| Proposed vs Anchor (HM 16.2+SCM 8.8) | -15.0% | -23.6% | -27.3% | -24.2% | -16.5% | -19.0% | -8.0% | -10.8% | -18.05% |

FIG. 18

| | Descriptor |
|---|---|
| coding_unit(x0,y0, log2CbSize) { | |
|   if(transquant_bypass_enavled_flag) | |
|     cu_transquant_bypass_flag | ae(v) |
|   if(slice_type !=I) | |
|     cu_skip_flag[x0][y0] | ae(v) |
|   nCOS=(1 << log2CbSize) | |
|   if(cu_skip_flag[x0][y0]) { | |
|     cu_lfv_flag[x0][y0] | ae(v) |
|     prediction_unit(x0, y0, nCbs, nCbs) | |
|   }else{ | |
|     if(slice_type !=I) | |
|       pred_mide_flag | ae(v) |
|     if(CuPredMode[x0][y0] != MODE_INTRA \|\| lof2CbSize == MinCbLog2SizeY) | |
|       part_mode | ae(v) |
|     if(CuPredMode[x0][y0] == MODE_INTRA) { //Intra prediction syntax | |
|       ... | |
|     }else{                     //Intra prediction syntax | |
|       cu_lfv_flag[x0][y0] | ae(v) |
|       if PartMode == PART_2Nx2N) | |
|         prediction_unit(x0, y0, nCbS, nCbs) | |
|       else if(PartMode == PART_2NxN) { | |
|         ... | |
|       } | |
|     } | |
|     if(!pcm_flag[x0][y0]) { | |
|       ... | |
|     } | |
|   } | |
|   } | |
| } | |

FIG. 19

| coding_unit(x0, y0, cbWidth, cdHeight, cqtDepth, treeType, modeType{ | Descriptor |
|---|---|
| if(sh_slice_type == I && (cbWidth>64 \|\| cbHeight>64)) | |
|    modeType = MODE_TYPE_INTRA | |
| chType = treeType == DUAL_TREE_CHROMA ?1:0 | |
| if(sh_slice_type != I \|\| sps_ibc_enavled_flag){ | |
|   if(treeType != DUAL_TREE_CHROMA && <br>     (((!(cbWidth == 4 && cbHeight == 4) && <br>     modeType != MODE_TYPE_INTRA) \|\| <br>     (sps_ibc_enabled_flag && cbWidth <= 64 && cbHeight <= 64))) | |
|    cu_skip_flag[x0[y0] | ae(v) |
|   if(cu_skip_flag[x0][y0] == 0 && sh_slice_type != I && <br>    !(cbWidth == 4 && cbHeight == 4) && modeType == MODE TYPE_ALL) | |
|    pred mode flag                  // 0: Inter, 1: Intra | ae(v) |
| if(CupredMode[chType][x0][y0] == MODE_INTRA \|\| <br>    CuPredMide[chType][x0][y0] == MODE_PLT) { | |
|    ...                                   //Intra prediction syntax | |
| } else if(treeType != DUAL_TREE_CHROMA) {/* MODE_INTER or MODE_IBC */ | |
|    cu_lfv_flag[x0][y0] | ae(v) |
|    ... | |
| } | |
| if(CuPredMode[chType][x0][y0] != MODE_INTRA && !pred_mode_plt_flag && <br>    general_merge_flag[x0][y0] == 0) | |
|    cu_coded_flag | ae(v) |
| if(cu_coded_flag){ | |
|   if(CuPredMode[chType][x0][y0] == MODE_INTRA && sps_sbt_enabled_flag && <br>    !ciip_flag[x0][y0] && cbWidth <= MaxTbSizeY && cbHeight <= MaxTbSizeY) { | |
|    ...                          //Subblock Transform syntax | |
|   } | |
| } | |
|    ...                          //Subblock Transform syntax | |
| } | |
| } | |

FIG. 20

| | Descriptor |
|---|---|
| prediction_unit( x0, y0, nPbW, nPbH ) { | |
|   pu_ih_flag[ x0 ][ y0 ] | ae(v) |
|   if( cu_skip_flag[ x0 ][ y0 ] ) { | |
|     if( MaxNumMergeCand > 1 ) | |
|       merge_idx[ x0 ][ y0 ] | ae(v) |
|   } else { /* MODE_INTER */ | |
|     merge_flag[ x0 ][ y0 ] | ae(v) |
|     if( merge_flag[ x0 ][ y0 ] ) { | |
|       if( MaxNumMergeCand > 1 ) | |
|         merge_idx[ x0 ][ y0 ] | ae(v) |
|     } else { | |
|       if( slice_type == B ) | |
|         inter_pred_idc[ x0 ][ y0 ] | ae(v) |
|       if( inter_pred_idc[ x0 ][ y0 ] != PRED_L1 ) { | |
|         if( num_ref_idx_l0_active_minus1 > 0 ) | |
|           ref_idx_l0[ x0 ][ y0 ] | ae(v) |
|         mvd_coding( x0, y0, 0 ) | |
|         mvp_l0_flag[ x0 ][ y0 ] | ae(v) |
|       } | |
|       if( inter_pred_idc[ x0 ][ y0 ] != PRED_L0 ) { | |
|         if( num_ref_idx_l1_active_minus1 > 0 ) | |
|           ref_idx_l1[ x0 ][ y0 ] | ae(v) |
|         if( mvd_l1_zero_flag && inter_pred_idc[ x0 ][ y0 ] == PRED_BI ) { | |
|           MvdL1[ x0 ][ y0 ][ 0 ] = 0 | |
|           MvdL1[ x0 ][ y0 ][ 1 ] = 0 | |
|         } else | |
|           mvd_coding( x0, y0, 1 ) | |
|         mvp_l1_flag[ x0 ][ y0 ] | ae(v) |
|       } | |
|     } | |
|   } | |
| } | |

METHOD FOR ENCODING AND DECODING VIDEO AND APPARATUS THEREOF

CROSS-REFERENCE TO RELATED APPLICATIONS

This application claims the priority benefit of Korean Patent Application No. 10-2022-0109940 filed on Aug. 31, 2022 in the Korean Intellectual Property Office, the disclosures of which are incorporated herein by reference.

BACKGROUND

1. Field

The present invention relates to a method and apparatus for encoding and decoding a video captured by a camera.

2. Description of the Related Art

Unlike conventional video that captures only temporal and spatial information of an image formed on an image sensor of a camera through a lens, a plenoptic camera (or light field camera) may acquire light field video that may additionally record view point or view direction information, in addition to the temporal and spatial information, by arranging a microlens array (MLA) as shown in FIG. 1 so that light traveling from one position of a subject in directions different from each other may enter light-receiving pixels different from each other on the image sensor.

As shown in FIG. 2A, light rays of a predetermined brightness (radiance) emitted from a scene point pass through the main lens and gather inside the camera to form an image point, and the light rays spread out from the image point pass through the microlenses, and reach an image sensor and form a predetermined pixel value. In the case of capturing video using a plenoptic camera, when the scene point moves, the light rays also move as shown in FIG. 2B, and therefore, as the image point moves, pixel coordinates of the image sensor at which the light rays reach also change. At this point, movement of the light rays may be divided into two cases.

First, it is a case where the light ray at the current time instant passes through a microlens and also passes through a microlens at a time instant of a reference frame as shown in FIG. 3A.

In this case, an encoding apparatus may find a motion vector by finding the displacement of the light ray in an area of the image sensor through motion detection. In addition, a decoder may generate a prediction block using the received motion vector.

Second, it is a case where the light ray passes through a microlens at the current time instant as shown in FIG. 3B, but does not pass through a microlens and is blocked at the time instant of the reference frame.

In this case, since the light ray that passes through the microlens and reaches the image sensor at the current time instant does not pass through the microlens and is blocked not to reach the image sensor at the time instant of the reference frame, the encoding apparatus may not find the displacement of the corresponding light ray when searching for a motion and calculates an incorrect motion vector, and the encoding apparatus estimates an incorrect motion vector. In addition, when the decoding apparatus generates a prediction block using the motion vector received from the encoding apparatus, there is a problem in that a large error may occur in the restored image, or encoding efficiency may be seriously impaired, or quality of the restored image may be seriously impaired.

Accordingly, it is required to provide a method and apparatus for encoding and decoding light field video, which can effectively solve these problems.

SUMMARY

The present invention to provide a method and apparatus for encoding and decoding a video, which can solve the problems that may occur in encoding and decoding when light rays are blocked not to reach the image sensor plane in consideration of movement of the light rays on the microlens array plane when encoding and decoding the video.

To accomplish the above object, according to one aspect of the present invention, there is provided a method of encoding a video, the method comprising the steps of: calculating horizontal and vertical displacements of an image block on the basis of a unit horizontal interval and a unit vertical interval; encoding a motion vector corresponding to the image block using the horizontal and vertical displacements; and encoding the unit horizontal interval and the unit vertical interval.

Preferably, the step of calculating horizontal and vertical displacements may include the steps of: calculating an integer part and a decimal part of the horizontal and vertical displacements of the image block on the basis of a precision, the unit horizontal interval, and the unit vertical interval; and calculating the horizontal and vertical displacements by multiplying an integer that makes a sum of the integer part and the decimal part of the horizontal and vertical displacements of the image block an integer.

Preferably, the step of encoding using a motion vector may include the step of encoding after including a distance on an image sensor plane, corresponding to each of the unit horizontal interval and the unit vertical interval, in a header of a bitstream at a resolution of the motion vector.

Preferably, the step of encoding using a motion vector may include the step of encoding after adaptively setting a resolution of a difference value of the motion vector for each coding unit (CU).

Preferably, the step of encoding using a motion vector may include the step of setting amvr_idx, wherein one of amvr_idx values indicates that the motion vector may be encoded and decoded at the resolution of the difference value of the motion vector.

Preferably, the step of encoding a motion vector may include the step of setting a flag value indicating that the method of encoding a video is used at one of levels of a NAL unit, a Sequence Parameter Set (SPS), a Picture Parameter Set (PPS), a CU, and a PU (Prediction unit).

Preferably, at the step of encoding a motion vector, the motion vector may be a block vector (BV) when a reference index of the encoding apparatus indicates a current picture, and the motion vector may be a motion vector (MV) corresponding to the horizontal and vertical displacements when the reference index does not indicate the current picture.

In addition, a method of decoding an encoded video according to an embodiment of the present invention for achieving the object described above comprises the steps of: decoding a unit horizontal interval and a unit vertical interval; and decoding a motion vector corresponding to an image block using the unit horizontal interval and a unit vertical interval.

Preferably, the step of decoding a motion vector corresponding to an image block includes the steps of: acquiring a distance on an image sensor plane corresponding to each of the unit horizontal interval and the unit vertical interval from an encoded bitstream; calculating an integer part and a decimal part of the horizontal and vertical displacements of the image block on the basis of precision from the motion vector included in the bitstream; and calculating a pixel value of a decoding target point on the image sensor plane, on the basis of the distance on the image sensor plane and the integer part and the decimal part of the horizontal and vertical displacements.

Preferably, the step of calculating a pixel value of a decoding target point includes the steps of: determining a target position, which is a position corresponding to the decoding target point, using the integer part and the decimal part of the horizontal and vertical displacements; calculating the pixel value of the decoding target point as a pixel value corresponding to the target position on the image sensor plane; and calculating the pixel value of the decoding target point using an interpolation filter that uses pixel values of the image sensor plane adjacent to the target position.

Preferably, the step of calculating the pixel value of the decoding target point using an interpolation filter may include the step of performing interpolation using pixel values at positions spaced apart as much as a distance on the image plane corresponding to each of the unit horizontal interval and the unit vertical interval.

Preferably, the bitstream may include the distance on the image sensor plane, corresponding to each of the unit horizontal interval and the unit vertical interval, in a header at a resolution of the motion vector.

Preferably, the step of calculating an integer part and a decimal part of the horizontal and vertical displacements may include calculating an integer part and a decimal part of the horizontal and vertical displacements when a reference index does not indicate a current picture.

Preferably, a resolution of a difference value of the motion vector may be adaptively set for each CU.

Preferably, whether or not to use the method of decoding a video may be determined according to a flag value preset at one of the levels of a NAL unit, a Sequence Parameter Set (SPS), a Picture Parameter Set (PPS), a CU, and a PU.

An apparatus for decoding an encoded video comprises: a header decoding unit for acquiring a distance on an image sensor plane corresponding to each of a unit horizontal interval and a unit vertical interval from an encoded bitstream; a displacement calculation unit for calculating an integer part and a decimal part of the horizontal and vertical displacements on the basis of precision from a motion vector included in the bitstream; and a pixel value calculation unit for calculating a pixel value of a decoding target point on the image sensor plane, on the basis of the distance on the image sensor plane and the integer part and the decimal part of the horizontal and vertical displacements.

Preferably, the pixel value calculation unit may determine a target position, which is a position corresponding to the decoding target point, using the integer part and the decimal part of the horizontal and vertical displacements, calculate the pixel value of the decoding target point as a pixel value corresponding to the target position on the image sensor plane, calculate the pixel value of the decoding target point using an interpolation filter that uses the pixel values of pixels of the image sensor plane adjacent to the target position, and perform interpolation using pixel values at positions spaced apart as much as a distance on the image plane corresponding to each of the unit horizontal interval and the unit vertical interval.

Preferably, the bitstream may include the distance on the image sensor plane, corresponding to each of the unit horizontal interval and the unit vertical interval, in a header at a resolution of the motion vector.

Preferably, when a reference index is not a current picture the displacement calculation unit may calculate an integer part and a decimal part of the horizontal and vertical displacements.

Preferably, a resolution of a difference value of the motion vector may be adaptively set for each CU.

The present invention has an effect of reducing encoding time complexity, as well as enhancing encoding efficiency, by considering movement inside a plenoptic camera in the case of inter-picture prediction of a video.

BRIEF DESCRIPTION OF THE DRAWINGS

FIG. 15 is a table showing variable values for setting the resolution of a motion vector or difference values of the motion vector according to an embodiment of the present invention.

FIGS. 16 and 17 are views showing a result of verifying encoding performance according to an embodiment of the present invention.

FIGS. 18 and 19 are views for explaining an encoding and decoding method of an existing codec showing syntax added in the case of HEVC and VVC.

FIG. 20 is a view for explaining an encoding method showing added syntax.

DETAILED DESCRIPTION

Figure 1:
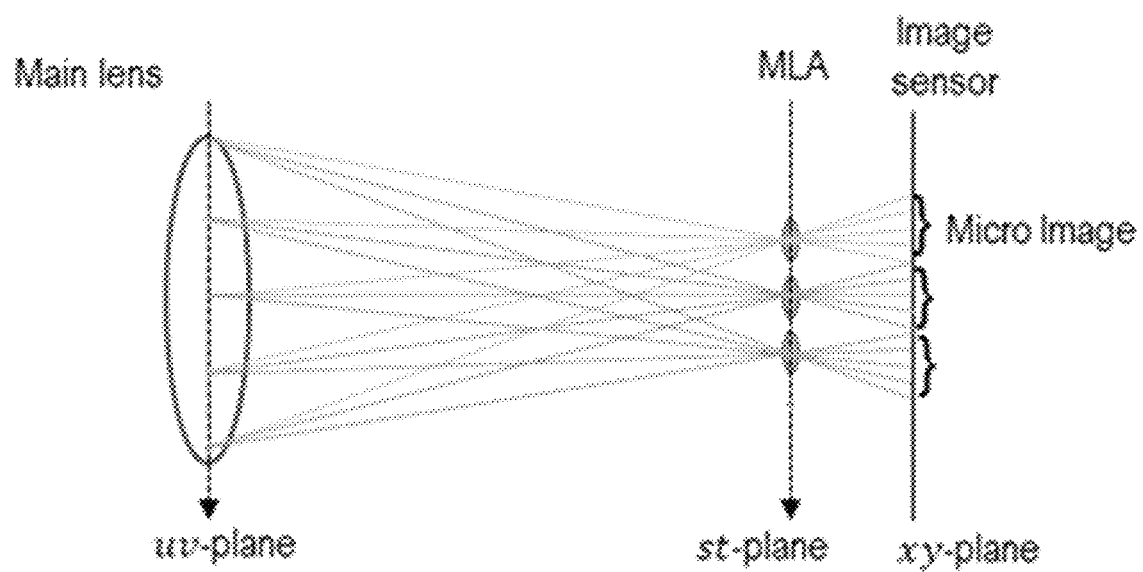
FIGS. 1, 2A, 2B, 3A, and 3B are views for explaining a plenoptic camera.
Figure 2A:
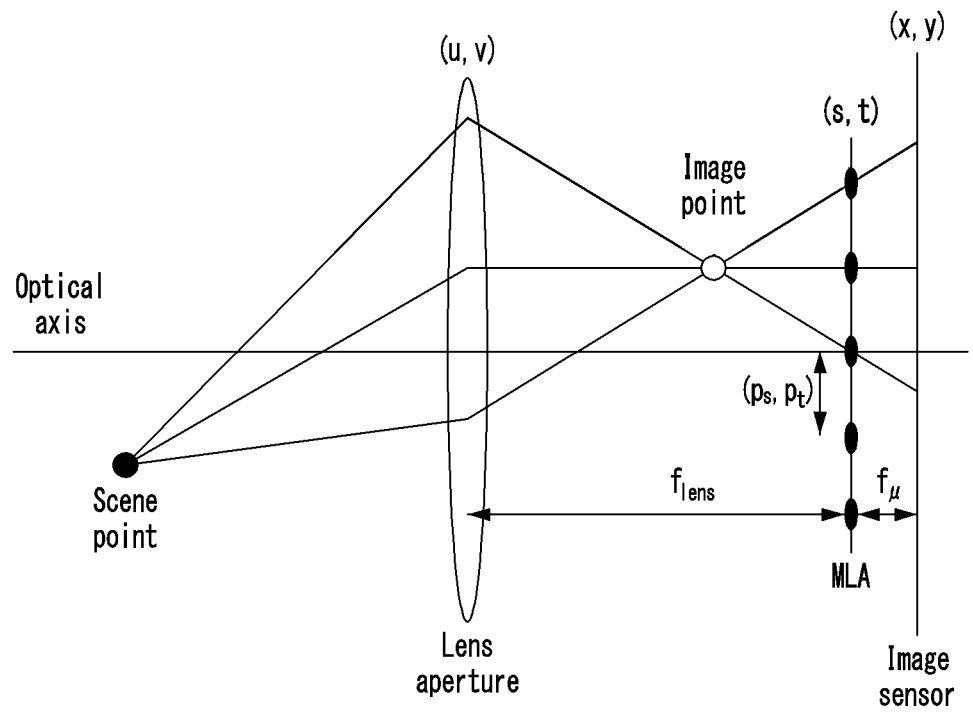
Figure 2B:
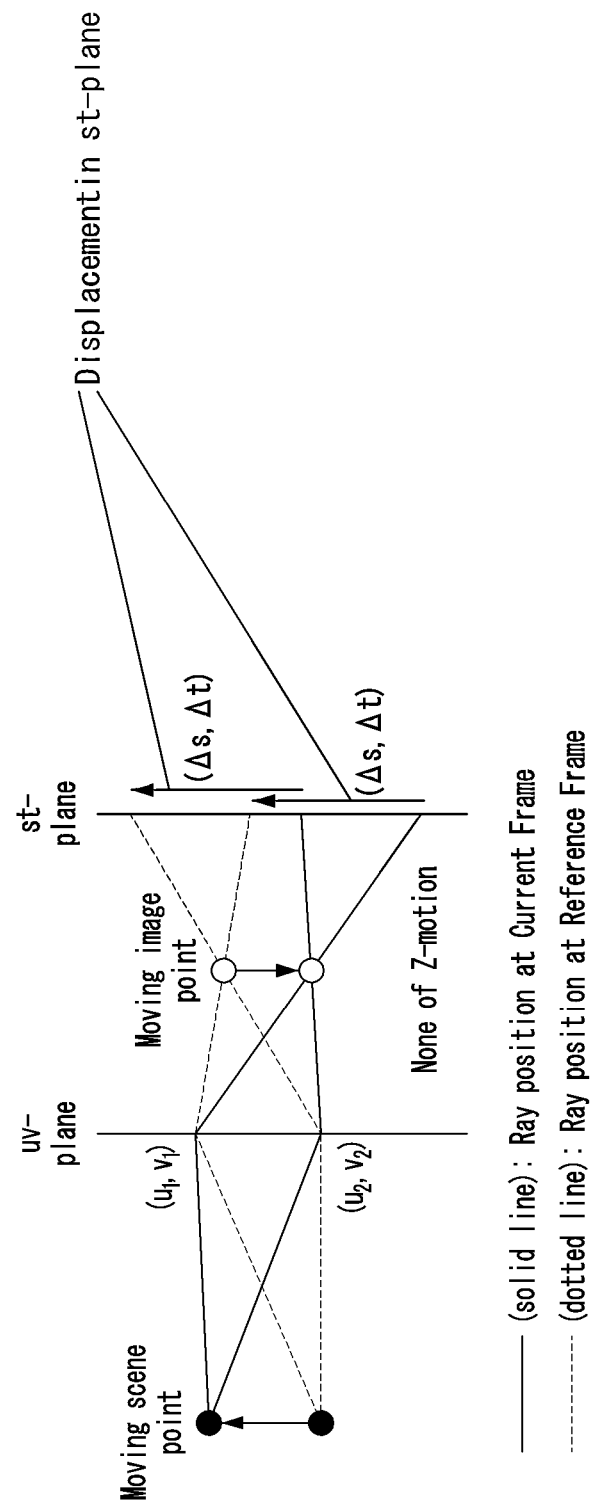

The advantages and features of the present invention and methods for achieving them will become clear with reference to the embodiments described below in detail in conjunction with the accompanying drawings. However, the present invention is not limited to the embodiments disclosed below and may be implemented in various different forms, and these embodiments are provided only to make the disclosure of the present invention complete and to fully inform those skilled in the art of the scope of the present invention, and the present invention is only defined by the scope of the claims.

The terms used in this specification will be briefly explained, and the present invention will be described in detail.

Although the terms used in this specification have been selected from general terms widely used in the present as much as possible while considering the functions used in the present invention, they may vary according to the intention of a technician working in this field, precedents, or advent of new techniques. In addition, in a specific case, there may also be terms arbitrarily selected by the applicant, and in this case, meanings thereof will be described in detail in corresponding descriptions of the present invention. Therefore, the terms used in the present invention are not simply names of terms, but should be defined on the basis of meaning of the terms and the overall contents of the present invention.

When it is said that a certain part "includes" a certain component throughout the specification, it means that other components may be further included, rather than excluding other components, unless stated otherwise. In addition, terms such as "part", "module", "unit", and the like described in the specification mean a unit that processes at least one function or operation, and may be implemented as software, hardware components such as FPGAs or ASICs, or a combination of software and hardware. However, the terms such as "part", "module", "unit", and the like are not limited to software or hardware. The terms such as "part", "module", "unit", and the like may be configured to reside in an addressable storage medium and may be configured to reproduce one or more processors. Accordingly, as an example, the terms such as "part", "module", "unit", and the like include components such as software components, object-oriented software components, class components, and task components, and processes, functions, attributes, procedures, subroutines, segments of program codes, drivers, firmware, microcode, circuits, data, databases, data structures, tables, arrays, and variables.

Hereinafter, embodiments of the present invention will be described in detail with reference to the attached drawings so that those skilled in the art may easily implement. In addition, in order to clearly explain the present invention in the drawings, parts unrelated to the description will be omitted.

Although the terms including ordinal numbers such as first, second, and the like used in this specification may be used to describe various components, the components are not limited by the terms. The terms are used only for the purpose of distinguishing one component from another. For example, a first component may be named as a second component without departing from the scope of the present invention, and similarly, a second component may also be named as a first component. The term "and/or" includes a combination of a plurality of related items or any one item among the plurality of related items.

Hereinafter, the present invention will be described with reference to the attached drawings.

Figure 4:
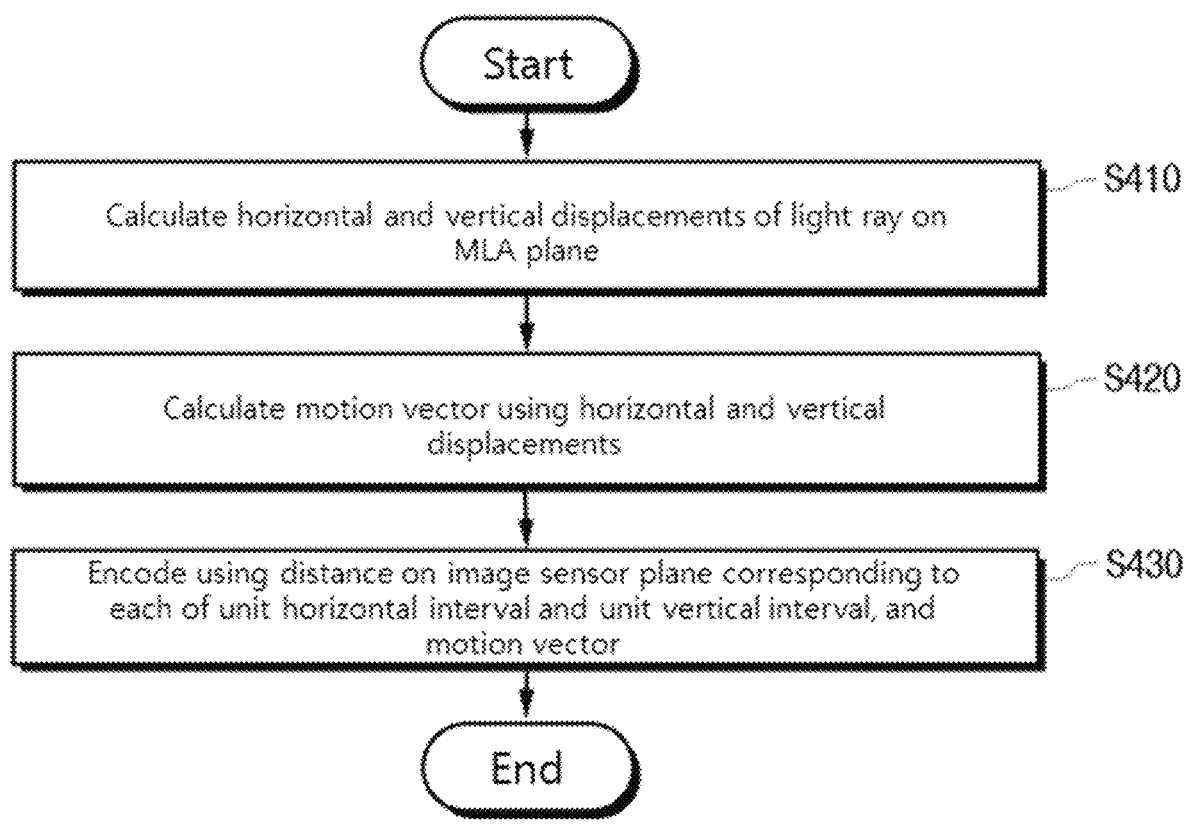
FIG. 4 is a flowchart illustrating a method of encoding a light field video according to an embodiment of the present invention.

FIG. 4 is a flowchart illustrating a method of encoding a light field video according to an embodiment of the present invention.

Although an encoding method and a decoding method are described on the basis of light field video in an embodiment of the present invention, encoding and decoding may be performed on the basis of other types of videos.

At step S410, the encoding apparatus calculates horizontal and vertical displacements of a light ray on an MLA plane on the basis of a unit horizontal interval and a unit vertical interval representing horizontal and vertical intervals between microlenses on the MLA plane.

The encoding apparatus may calculate horizontal and vertical displacements of an image block on the basis of the unit horizontal interval and the unit vertical interval.

At this point, the encoding apparatus may calculate the horizontal and vertical displacements of an image block other than the light ray, and the light ray and the image block may be used interchangeably in the following description.

Figure 3A:
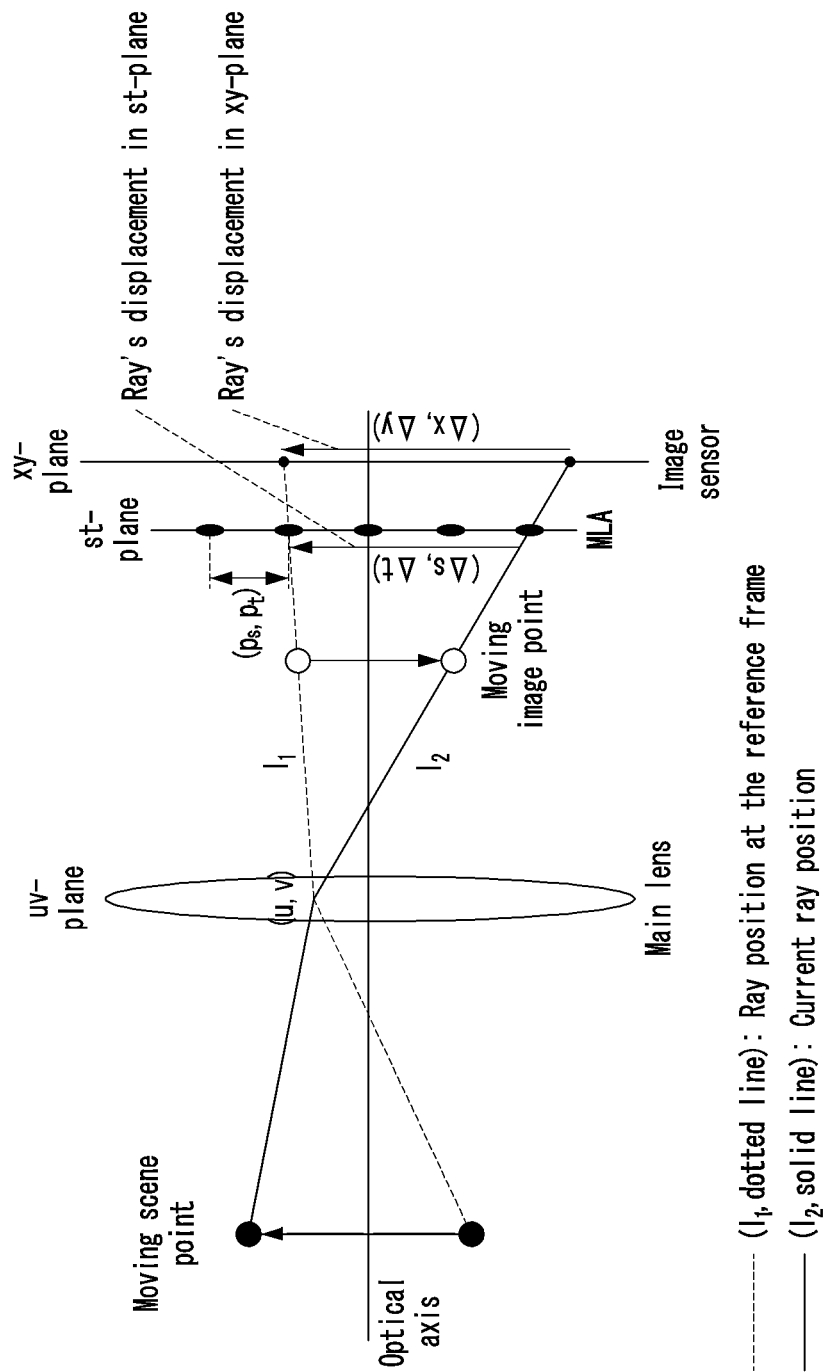
Figure 3B:
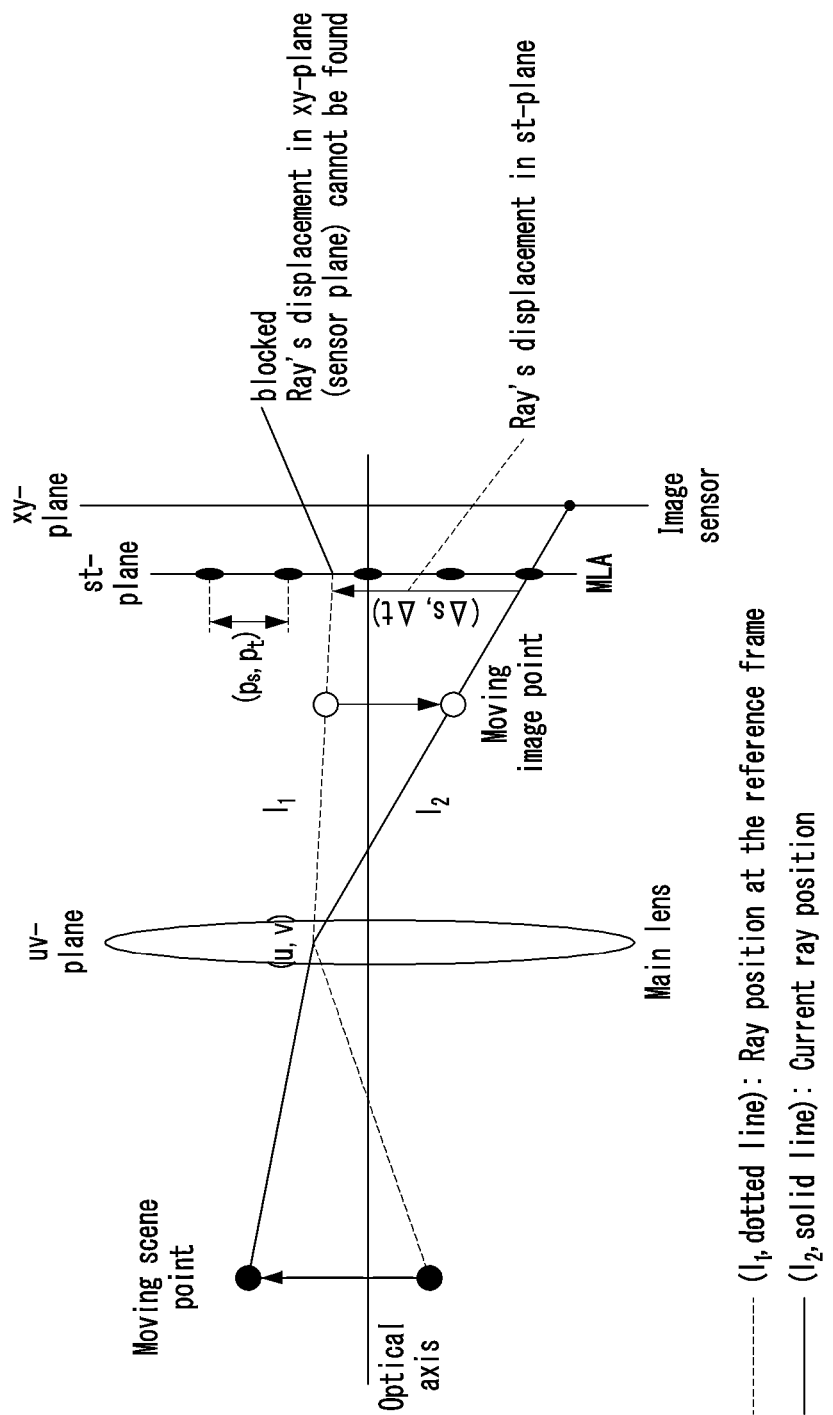

As described above with reference to FIG. 3B, the encoding apparatus may calculate displacement on the MLA plane instead of the motion vector, which is the displacement on the image sensor plane, considering a case where a light ray passing through a specific point of the main lens is blocked at the MLA plane.

More specifically, the encoding apparatus may calculate ($\Delta k_s$, $\Delta k_t$) and ($\alpha$, $\beta$), which are the integer part and the decimal part of the horizontal and vertical displacements on the MLA plane, on the basis of the unit horizontal interval and the unit vertical interval.

At step S420, the encoding apparatus calculates a motion vector corresponding to the light ray using the horizontal and vertical displacements.

The encoding apparatus may encode the motion vector corresponding to an image block using the horizontal and vertical displacements.

That is, the encoding apparatus may calculate ($d_s$, $d_t$) as a motion vector using ($\Delta k_s$, $\Delta k_t$) and ($\alpha$, $\beta$), which are the integer part and the decimal part of the horizontal and vertical displacements calculated previously.

At this point, the motion vector is calculated using Equation 1 shown below, and when quarter-pel precision such as $$(\alpha, \beta) = \left\{ 0, \frac{1}{4}, \frac{1}{2}, \frac{3}{4} \right\}$$

is used, N may be 4.

$$\begin{cases} d_s = N \times (\Delta k_s + \alpha) \\ d_t = N \times (\Delta k_t + \alpha) \end{cases} \quad \text{[Equation 1]}$$

Here, ($d_s$, $d_t$) is the motion vector corresponding to the horizontal and vertical displacements on the MLA plane.

Finally, at step S430, the encoding apparatus encodes using the distance on the image sensor plane corresponding to each of the unit horizontal interval and the unit vertical interval, and a motion vector thereof.

Figure 9:
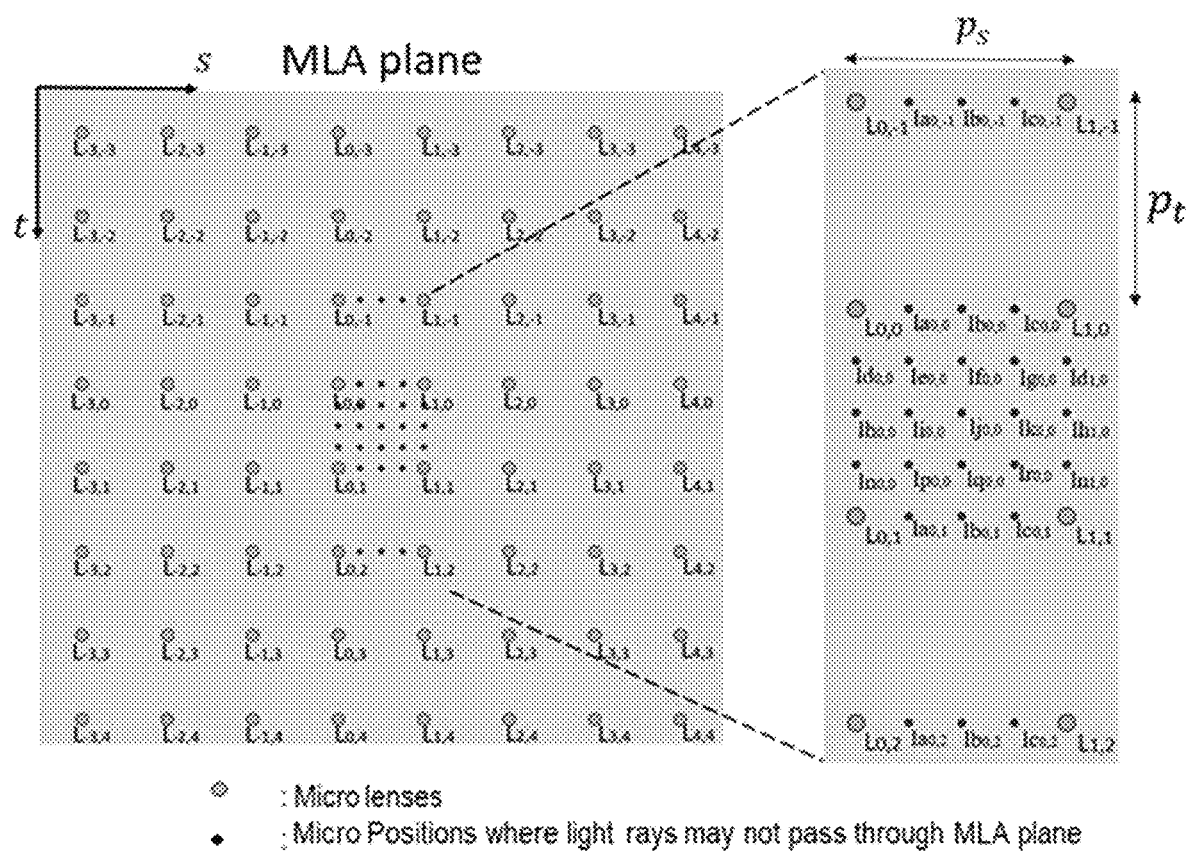
FIGS. 9 and 10 are views for explaining an interpolation method according to an embodiment of the present invention.
Figure 10:
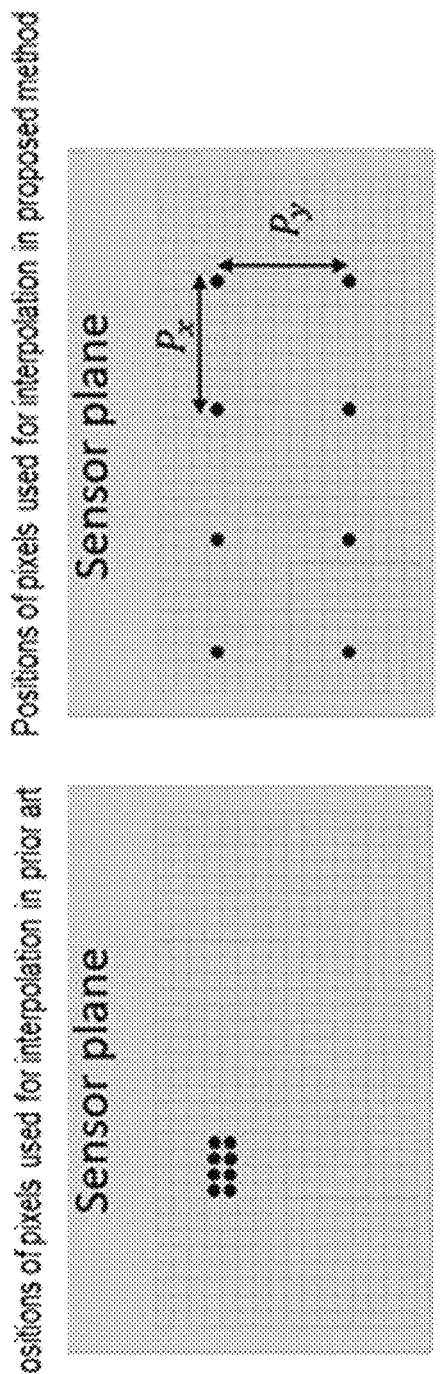
Figure 11:
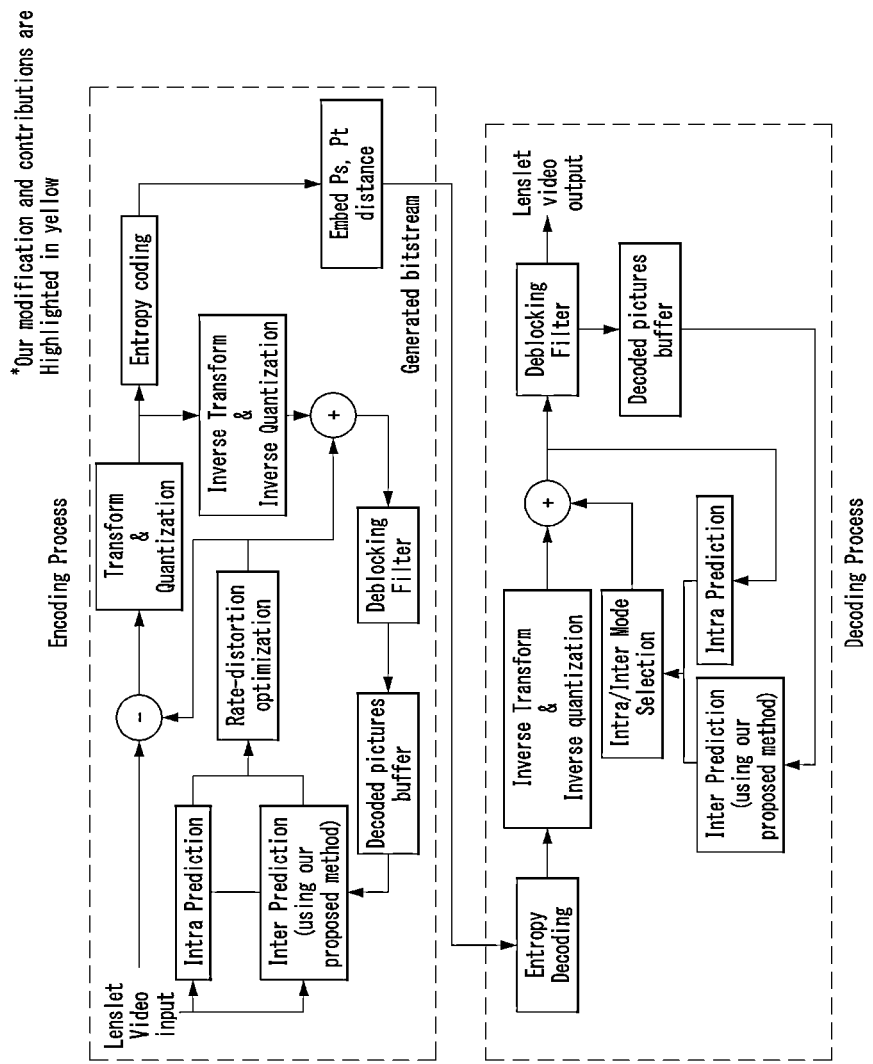
FIG. 11 is a diagram illustrating the encoding and decoding processes of a light field video according to an embodiment of the present invention.
Figure 12:
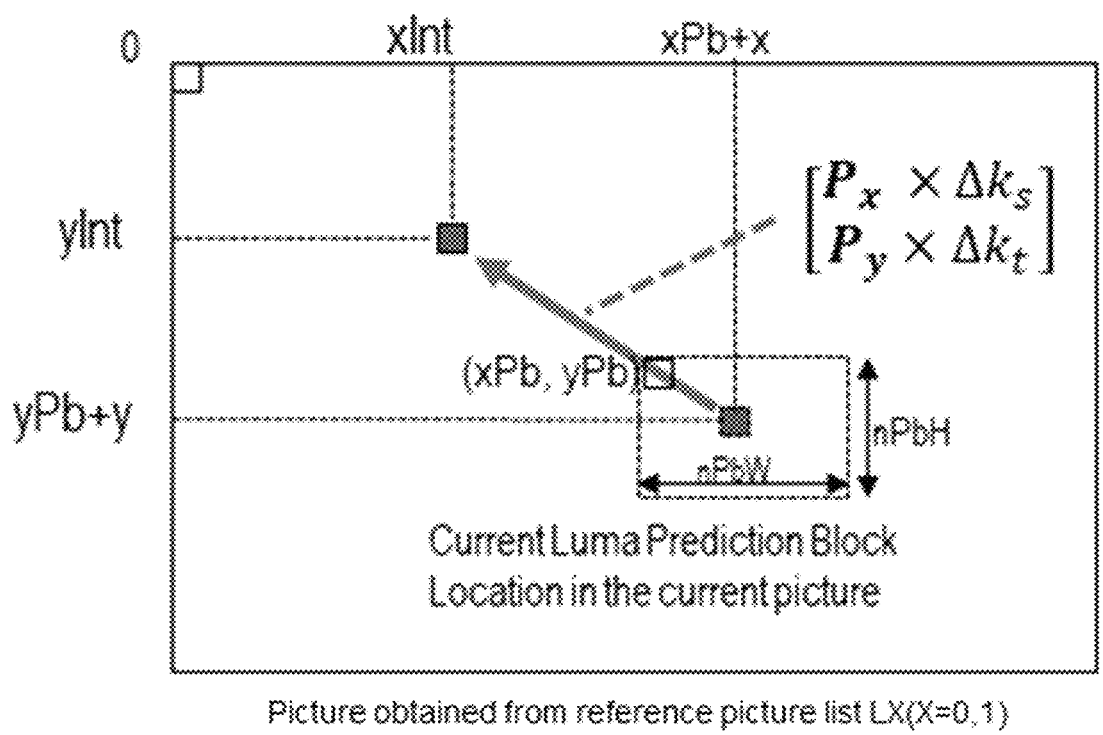
FIGS. 12 and 13 are views for explaining displacement in an image sensor plane according to an embodiment of the present invention.
Figure 13:
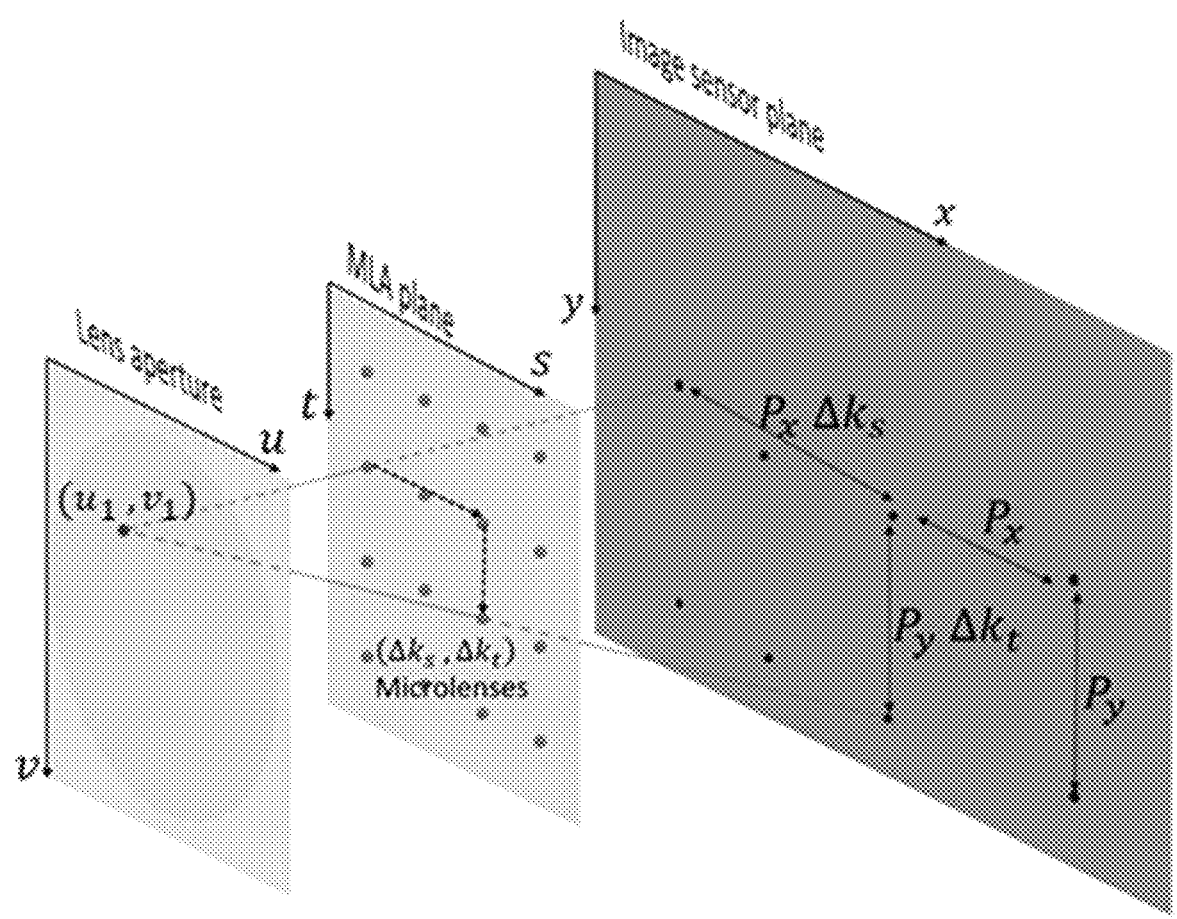
Figure 14:
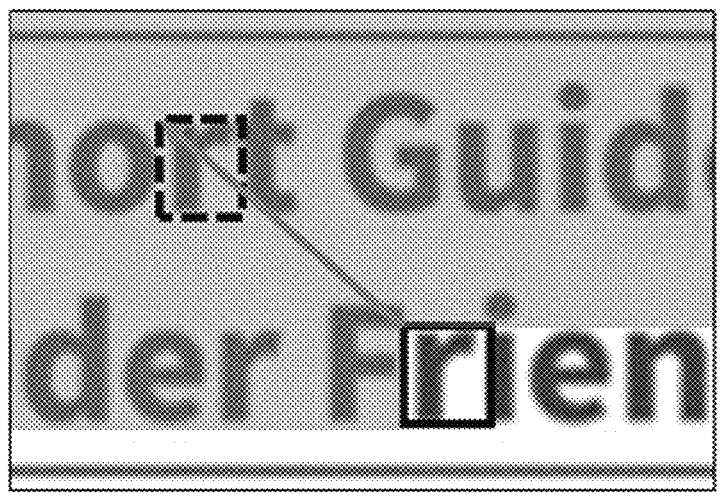
FIG. 14 is a view for explaining an intra block copy mode.

FIGS. 9 and 10 are views for explaining an interpolation method according to an embodiment of the present invention, FIG. 11 is a diagram illustrating the encoding and decoding processes of a light field video according to an embodiment of the present invention, FIGS. 12 and 13 are views for explaining displacement in an image sensor plane according to an embodiment of the present invention, FIG. 14 is a view for explaining an intra block copy mode, and FIG. 15 is a table showing variable values for setting the resolution of a motion vector or difference values of the motion vector according to an embodiment of the present invention.

That is, referring to FIGS. 10, 11, and 13, the encoding apparatus may encode ($P_x$, $P_y$), which is the distance on the image sensor plane corresponding to the unit horizontal interval and the unit vertical interval, respectively, and add the distance in the header of a generated bitstream. In addition, the encoding apparatus may encode so that the motion vector may be included in the bitstream.

In other words, the encoding apparatus may encode the unit horizontal interval and the unit vertical interval.

In another embodiment, the encoding apparatus may perform encoding after adaptively setting the resolution of the difference value of the motion vector for each coding unit (CU).

Although it has been described in an embodiment of the present invention that the resolution of the difference value of the motion vector is encoded or decoded, the same may be applied to encoding or decoding the motion vector value itself.

That is, the encoding apparatus may adaptively set and use the resolution of the motion vector or its difference value for each CU through an index and a flag. This may be implemented by expanding the Adaptive Motion Vector Resolution (AMVR) technique of Versatile Video Coding (VVC), which is an existing technique. That is, it can be easily implemented by adding the technique of the present invention to the existing AMVR technique so that the precision of ($d_s$, $d_t$), which is the displacement of the light ray on the MLA plane, may be signaled. More specifically, when a low-resolution motion vector of 1 or 4-pel is used, the number of bits used for encoding the motion vector can be saved. However, as the precision of motion prediction is lowered, a lot of prediction error signals are generated. On the other hand, when a high-resolution motion vector of ¼ or ¹⁄₁₆ is used, the precision of prediction is enhanced compared to the case of low resolution, and although the prediction error signal may be generated less frequently, more bits are used in encoding the motion vector.

Therefore, unlike the HEVC, which is a conventional technique that processes the resolution of all motion vectors in units of quarter-pel, as the VVC includes AMVR, which is a technique for adaptively setting the difference value of the motion vector for each CU by additionally sending an index and a flag to minimize the rate-distortion cost (RD-cost), the present invention may be implemented by improving the existing AMVR technique in accordance with the present invention. More specifically, as shown in FIG. 15, the resolution of the difference value of the motion vector according to amvr_flag and amvr_precision_idx is newly set in accordance with the present invention to implement the present invention, the conventional problems can be solved by further improving utilization and efficiency of the existing VVC technique. In the case of the existing AMVR technique, the resolution of a motion vector may not be set to an arbitrary value. That is, it is limited to use only a value of a predetermined specific resolution, such as 1-pel or ¼-pel. However, according to the present invention, there is an advantage in that a user may determine a resolution according to an image to be encoded.

For example, when a light ray passes through a microlens on the MLA plane as shown in FIG. 13, the displacement of the light ray on the sensor plane is always an integer multiple of $P_x$ and $P_y$ in the horizontal and vertical directions, respectively. In addition, since vector (N, M) that the decoding apparatus receives from the encoding apparatus for integers N and M shows a displacement as much as ($NP_x$, $MP_y$) in the horizontal and vertical directions on the sensor plane, it can be seen that the vector (N, M) has a precision of ($P_x$, $P_y$).

Therefore, in order to efficiently express the displacement, according to the present invention, the encoding apparatus may implement the AMVR to expand by newly setting a value of amvr_precision_idx (e.g., by setting a case having a value of 3, which has not been used in the existing AMVR technique) as shown in FIG. 15 to indicate a case where the resolution of the difference value of the motion vector is ($P_x$, $P_y$). The implementation in FIG. 15 shows an implementation example using AMVR, and it goes without saying that according to applications, a case having a precision as high as ($P_x$, $P_y$) may be implemented as a case where amvr_precision_idx has a value other than 3 shown above as an example. Therefore, the present invention may be implemented in other ways including this method so that a resolution as high as ($P_x$, $P_y$) may be expressed as one of the resolutions indicated by AMVR.

In other words, the encoding apparatus may set amvr_idx, and one of the amvr_idx values may indicate that a motion vector may be encoded and decoded at the resolution of the difference value of the motion vector.

In addition, according to the present invention, corresponding resolution information, i.e., the value of ($P_x$, $P_y$), is recorded and encoded in a bitstream so that the decoder may read information on ($P_x$, $P_y$) recorded in the bitstream when decoding is performed, and decode the motion vector (or block vector) at a resolution corresponding to ($P_x$, $P_y$).

In another embodiment, when the encoding apparatus calculates the horizontal and vertical displacements, the encoding apparatus may calculate the integer part and the decimal part of the horizontal and vertical displacements of the light ray on the basis of a predetermined precision, the unit horizontal interval, and the unit vertical interval, and calculate the horizontal and vertical displacements by multiplying a smallest integer that makes the sum of the integer part and the decimal part of the horizontal and vertical displacements of the light ray an integer.

For example, when the encoding apparatus uses a quarter precision, the encoding apparatus may calculate each value so that the integer part of the horizontal and vertical displacements may become an integer and the decimal part may become one among {0, ¼, ½, ¾}. In addition, the encoding apparatus may calculate the horizontal and vertical displacements by multiplying the sum of the integer part and the decimal part of the horizontal and vertical displacements by 4, which is a minimum integer that makes the sum an integer.

In still another embodiment, in the encoding apparatus, when the reference index indicates the current picture, the motion vector is a block vector (BV), and when the reference index does not indicate the current picture, the motion vector may indicate a motion vector corresponding to the horizontal and vertical displacements.

That is, the encoding apparatus may distinguish, through the reference index, whether the motion vector that the decoding apparatus receives is a block vector used in an intra block copy (IBC) mode or a displacement of a light ray on the MLA plane.

FIG. 14 is a view for explaining an intra block copy mode.

In addition, referring to FIG. 14, the IBC mode is a prediction technique that uses a reference block existing inside a restored area in the current picture, and the decoding apparatus may receive a block vector from the encoding apparatus and form a predictor by copying a reference block spaced apart from the current image block as much as BV.

However, when the encoding apparatus sets the reference index to be different from the current picture, the decoding apparatus may recognize motion vector corresponding to the displacement of the light ray on the MLA plane and perform decoding using it.

In still another embodiment, the encoding apparatus may set a flag value which indicates that the method of encoding a light field video according to an embodiment of the present invention is used at one of the levels of a NAL unit, a Sequence Parameter Set (SPS), a Picture Parameter Set (PPS), a CU, and a PU (Prediction unit).

There may be several methods for signaling that the method of encoding a light field video according to an embodiment of the present invention has been used.

Figure 17:
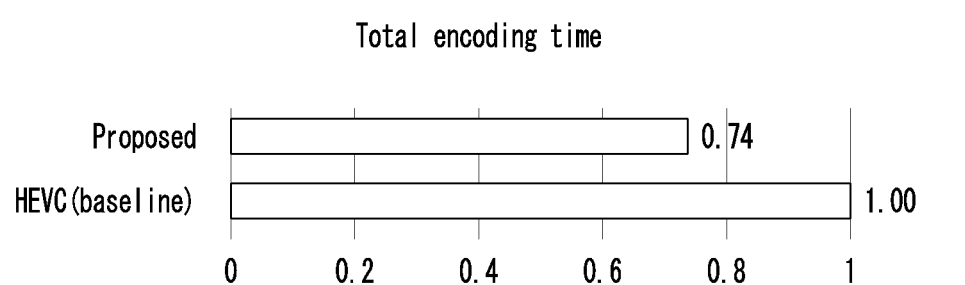

FIGS. 16 and 17 are views showing a result of verifying encoding performance according to an embodiment of the present invention.

FIGS. 18 and 19 are views for explaining an encoding and decoding method of an existing codec showing syntax added in the case of HEVC and VVC, and FIG. 20 is a view for explaining an encoding method showing added syntax.

First, the encoding apparatus may set syntax high_level_lfv_flag at the NAL unit level, Sequence Parameter Set (SPS) level, or Picture Parameter Set (PPS) level, which are levels higher than the CU. At this point, when high_level_lfv_flag=0, this may indicate that an encoding and decoding method of existing codecs, such as HEVC, VVC, and the like, is used as is in an inter-picture prediction mode. However, when high_level_lfv_flag=1, this may indicate that the method of encoding a light field video according to an embodiment of the present invention is used in the inter-picture prediction. More specifically, the syntax high_level_lfv_flag may be set in the Video Parameter Set (VPS), Sequence Parameter Set (SPS), and Picture Parameter Set (PPS).

Second, the encoding apparatus may set syntax cu_lfv_flag at the CU level. At this point, when cu_level_lfv_flag=0, this may indicate that an encoding and decoding method of existing codecs, such as HEVC, VVC, and the like, is used as is in the inter-picture prediction mode. When cu_level_lfv_flag=1, this may indicate that the method of encoding a light field video according to an embodiment of the present invention is used in the inter-picture prediction. More specifically, referring to FIGS. 18 and 19, in the case of HEVC and VVC, added syntax is shown.

Third, in the case of HEVC, the encoding apparatus may set syntax pu_lfv_flag at the prediction unit (PU) level. At this point, when pu_level_lfv_flag=0, this may indicate that an encoding and decoding method of existing codecs is used as is in the inter-picture prediction mode. When pu_level_lfv_flag=1, this may indicate that the method of encoding a light field video according to an embodiment of the present invention is used in the inter-picture prediction. More specifically, referring to FIG. 20, added syntax is shown.

Meanwhile, in order to verify the effectiveness of the encoding method of the present invention, performed on a data video data set and quantization parameters QP {24, 30, 36, 42} acquired from a Lytro Illum plenoptic camera using HM-16.21+SCM-8.8 under the condition of Low Delay B (LDB) configuration, and a PC equipped with an i7-8700 CPU @ 3.20 GHz and 32 GB RAM is used in the experiment. Referring to FIGS. 16 and 17, it may be confirmed that the encoding method of the present invention shows that the performance is excellent from the aspect of encoding efficiency and encoding time complexity compared to the prior art (anchor).

Figure 5:
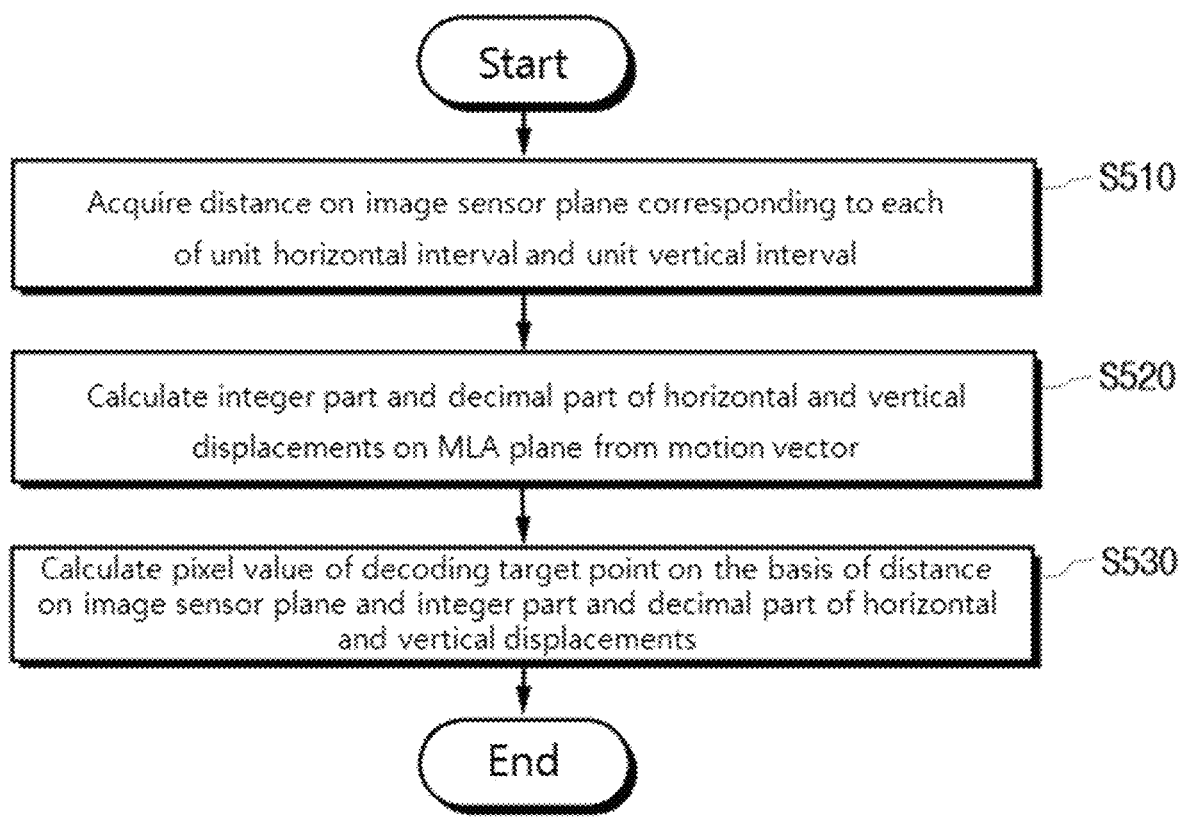
FIG. 5 is a flowchart illustrating a method of decoding a light field video according to an embodiment of the present invention.

FIG. 5 is a flowchart illustrating a method of decoding a light field video according to an embodiment of the present invention.

The decoding apparatus decodes the unit horizontal interval and the unit vertical interval.

Then, the decoding apparatus decodes a motion vector corresponding to a video block using the unit horizontal interval and the unit vertical interval.

More specifically, at step S510, the decoding apparatus acquires, from an encoded bitstream, a distance on the image sensor plane corresponding to each of the unit horizontal interval and the unit vertical interval, which indicate the horizontal and vertical intervals between microlenses on the MLA plane.

That is, the decoding apparatus may acquire ($P_x$, $P_y$), which is the distance on the image sensor plane corresponding to each of the unit horizontal interval and the unit vertical interval on the MLA plane from the header of the bitstream.

At step S520, the decoding apparatus calculates the integer part and the decimal part of the horizontal and vertical displacements on the MLA plane on the basis of a predetermined precision from the motion vector included in the bitstream.

That is, the decoding apparatus may acquire the integer part ($\Delta k_s$, $\Delta k_t$) and the decimal part ($\alpha$, $\beta$) of the horizontal and vertical displacements on the MLA plane from the motion vector included in the bitstream.

When a quarter-pel precision such as ($\alpha$, $\beta$)={0, ¼, ½, ¾} is used, since two bits on the right side of ($d_s$, $d_t$) correspond to the decimal part in Equation 1, the decoding apparatus may calculate the integer part ($\Delta k_s$, $\Delta k_t$) and the decimal part ($\alpha$, $\beta$) using Equation 2 shown below.

$$\Delta k_s = d_s >> 2$$

$$\Delta k_t = d_t >> 2$$

$$\alpha = (d_s \& 3)/4$$

$$\beta = (d_t \& 3)/4 \quad \text{[Equation 2]}$$

Finally, at step S530, the decoding apparatus calculates the pixel value of the decoding target point on the image sensor plane on the basis of the distance on the image sensor plane and the integer part and the decimal part of the horizontal and vertical displacements.

At this point, when the integer part of the displacements on the MLA plane is ($\Delta k_s$, $\Delta k_t$), it can be seen that the light ray passes through as many microlenses as ($\Delta k_s$, $\Delta k_t$) in the horizontal and vertical directions, respectively. In addition, referring to FIGS. 12 and 13, it can be seen that this corresponds to displacement as much as ($P_x \times \Delta k_s$, $P_y \times \Delta k_t$) on the image sensor plane.

That is, the decoding apparatus may calculate the pixel value of the decoding target point on the image sensor plane using the distance on the image sensor plane and the integer part and the decimal part of the horizontal and vertical displacements.

Figure 6:
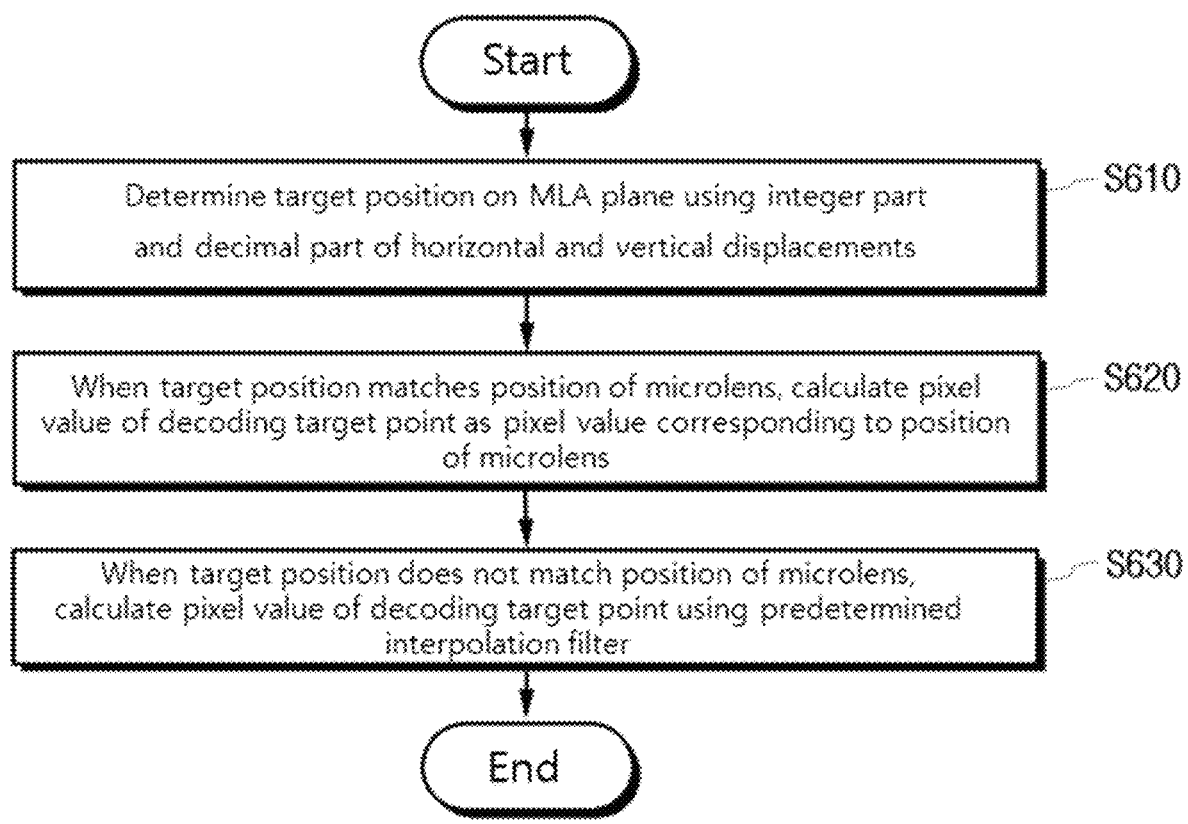
FIG. 6 is a flowchart illustrating an interpolation method when decoding a light field video according to an embodiment of the present invention.

In addition, the decoding apparatus may apply the interpolation method as shown in FIG. 6 below in consideration of a case where a light ray passing through a specific point of the main lens is blocked at the MLA plane.

In another embodiment, the bitstream may include the distance on the image sensor plane, corresponding to each of the unit horizontal interval and the unit vertical interval, in the header at the resolution of the motion vector.

In still another embodiment, when the decoding apparatus calculates the integer part and the decimal part of the horizontal and vertical displacements, the decoding apparatus may calculate the integer part and the decimal part of the horizontal and vertical displacements when the reference index does not indicate the current picture.

That is, when the reference index is set to be different from the current picture, the decoding apparatus may recognize a motion vector corresponding to the displacement of the light ray on the MLA plane and perform decoding using the motion vector.

In still another embodiment, the resolution of the difference value of the motion vector may be adaptively set for each CU.

That is, the decoding apparatus may know that the resolution of the difference value of the motion vector is adaptively set for each CU through an index and a flag. This may be implemented by expanding the Adaptive Motion Vector Resolution (AMVR) technique in the VVC, which is an existing technique.

For example, referring to FIG. 15, when the value that amvr_precision_idx has is a new value different from the AMVR of the existing VVC (for example, when it has a value of 3), the decoding apparatus may know that the resolution of the difference value of the motion vector is ($P_x$, $P_y$).

In still another embodiment, according to a flag value preset at one of the levels of a NAL unit, a Sequence Parameter Set (SPS), a Picture Parameter Set (PPS), a CU, and a PU, the decoding apparatus may know whether the method of decoding a light field video according to an embodiment of the present invention is used.

For example, when syntax high_level_lfv_flag=1 at the NAL unit level, Sequence Parameter Set (SPS) level, or Picture Parameter Set (PPS) level, which are levels higher than the CU, the decoding apparatus may decode by applying the method of decoding a light field video according to an embodiment of the present invention.

Alternatively, when syntax cu_lfv_flag=1 at the CU level, the decoding apparatus may decode by applying the method of decoding a light field video according to an embodiment of the present invention.

At step S620, when the target position matches the position of the microlens on the MLA plane, the decoding apparatus calculates the pixel value of the decoding target point as the pixel value corresponding to the position of the microlens on the image sensor plane.

The decoding apparatus may calculate the pixel value of the decoding target point as the pixel value corresponding to the target position on the image sensor plane.

Here, when the decimal part ($\alpha$, $\beta$) of the motion vector is (0,0), the decoding apparatus may determine that the target position matches the position of the microlens on the MLA plane. In addition, the decoding apparatus may determine the pixel value of the decoding target point as the pixel value that matches the position of the microlens corresponding to the integer part ($\Delta k_s$, $\Delta k_t$) of the motion vector on the image sensor plane.

Finally, at step S630, when the target position does not match the position of the microlens on the MLA plane, the decoding apparatus calculates the pixel value of the decoding target point using a predetermined interpolation filter that uses pixel values on the image sensor plane corresponding to the positions of microlenses adjacent to the target position.

The decoding apparatus may calculate the pixel value of the decoding target point using an interpolation filter that uses pixel values of the image sensor plane adjacent to the target position.

For example, referring to FIG. 9, the decoding apparatus may calculate the brightness (i.e., pixel values) of light rays that do not pass through the MLA plane, such as 1a, 1b, 1c, and the like, by interpolating using the brightness of light rays that passed through the neighboring microlens, such as L0,0, L1,0, L0,1, L1,1, and the like. In addition, after the interpolation, the decoding apparatus may determine a value of predSampleLX[x][y] by applying a quarter-pel interpolation filter of HEVC to the ($\alpha$, $\beta$) of quarter precision with reference to Table 1 shown below.

TABLE 1

| $\alpha$ | 0 | 0 | 0 | 0 | 1/4 | 1/4 | 1/4 | 1/4 |
|---|---|---|---|---|---|---|---|---|
| $\beta$ | 0 | 1/4 | 1/2 | 3/4 | 0 | 1/4 | 1/2 | 3/4 |
| predSampleLX[x][y] | $L_{0,0}$ << 14-BitDepth | $ld_{0,0}$ | $lh_{0,0}$ | $ln_{0,0}$ | $la_{0,0}$ | $le_{0,0}$ | $li_{0,0}$ | $lp_{0,0}$ |

| $\alpha$ | 1/2 | 1/2 | 1/2 | 1/2 | 3/4 | 3/4 | 3/4 | 3/4 |
|---|---|---|---|---|---|---|---|---|
| $\beta$ | 0 | 1/4 | 1/2 | 3/4 | 0 | 1/4 | 1/2 | 3/4 |
| predSampleLX[x][y] | $lb_{0,0}$ | $lf_{0,0}$ | $lj_{0,0}$ | $lq_{0,0}$ | $lc_{0,0}$ | $lg_{0,0}$ | $lk_{0,0}$ | $lr_{0,0}$ |

Alternatively, when syntax pu_lfv_flag=1 at the PU level, the decoding apparatus may decode by applying the method of decoding a light field video according to an embodiment of the present invention.

FIG. 6 is a flowchart illustrating an interpolation method when decoding a light field video according to an embodiment of the present invention.

At step S610, the decoding apparatus determines a target position, which is a position corresponding to the decoding target point, on the MLA plane using the integer part and the decimal part of the horizontal and vertical displacements.

At this point, the decoding apparatus may determine the target position by acquiring the integer part ($\Delta k_s$, $\Delta k_t$) and the decimal part ($\alpha$, $\beta$) from the motion vector included in the bitstream, for the horizontal and vertical displacements on the MLA plane.

That is, referring to FIG. 10, unlike the prior art, the decoding apparatus performs interpolation using the pixels located at the distances apart as much as ($P_x$, $P_y$) in the horizontal and vertical directions.

The decoding apparatus may perform interpolation using the pixel values at the positions spaced apart as much as the distance on the image sensor plane corresponding to each of the unit horizontal interval and the unit vertical interval.

At this point, it will be apparent to those skilled in the art that the decoding apparatus may use filters of a tap or a sub-pel precision different from those mentioned above according to various actual implementations.

Figure 7:
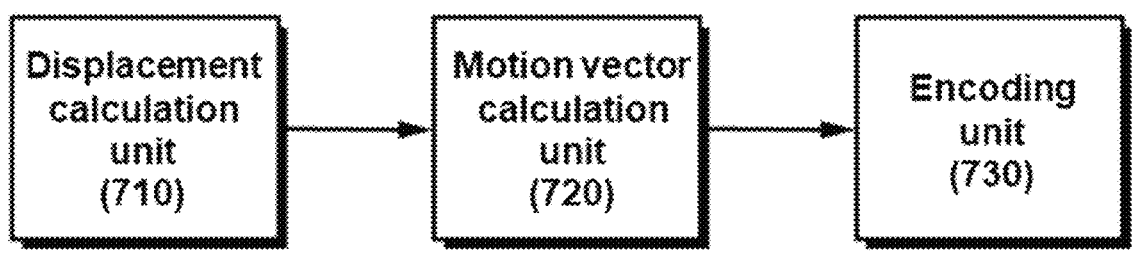
FIG. 7 is a block diagram for explaining an apparatus for encoding a light field video according to an embodiment of the present invention.

FIG. 7 is a block diagram for explaining an apparatus for encoding a light field video according to an embodiment of the present invention.

Referring to FIG. 7, the apparatus 700 for encoding a light field video according to an embodiment of the present invention includes a displacement calculation unit 710, a motion vector calculation unit 720, and an encoding unit 730.

Meanwhile, the apparatus 700 for encoding a light field video according to an embodiment of the present invention may be mounted on a computing device such as a desktop computer, a laptop computer, a server computer, a smartphone, a tablet PC, or the like.

The displacement calculation unit 710 calculates horizontal and vertical displacements of light rays on an MLA plane on the basis of a unit horizontal interval and a unit vertical interval representing horizontal and vertical intervals between microlenses on the MLA plane.

The motion vector calculation unit 720 calculates a motion vector corresponding to the light ray using the horizontal and vertical displacements.

Finally, the encoding unit 730 encodes using the distance on the image sensor plane corresponding to each of the unit horizontal interval and the unit vertical interval, and a motion vector thereof.

In another embodiment, the displacement calculation unit 710 may calculate the integer part and the decimal part of the horizontal and vertical displacements of the light ray on the basis of a predetermined precision, the unit horizontal interval, and the unit vertical interval, and calculate the horizontal and vertical displacements by multiplying a smallest integer that makes the sum of the integer part and the decimal part of the horizontal and vertical displacements of the light ray an integer.

In still another embodiment, the encoding unit 730 may perform encoding after including the distance on the image sensor plane, corresponding to each of the unit horizontal interval and the unit vertical interval, in the header of the bitstream at the resolution of the motion vector.

In still another embodiment, the encoding unit 730 may perform encoding after adaptively setting the resolution of the difference value of the motion vector for each CU.

In still another embodiment, the encoding unit 730 may set a flag value indicating that the apparatus 700 for encoding a light field video has encoded at one of the levels of a NAL unit, a Sequence Parameter Set (SPS), a Picture Parameter Set (PPS), a CU, and a PU.

In still another embodiment, in the encoding unit 730, when the reference index indicates the current picture, the motion vector is a block vector (BV), and when the reference index does not indicate the current picture, the motion vector may indicate a motion vector corresponding to the horizontal and vertical displacements.

Figure 8:
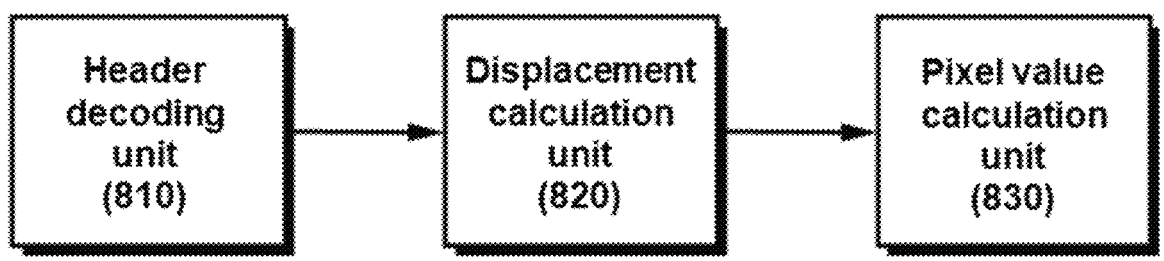
FIG. 8 is a block diagram for explaining an apparatus for decoding a light field video according to an embodiment of the present invention.

FIG. 8 is a block diagram for explaining an apparatus for decoding a light field video according to an embodiment of the present invention.

Referring to FIG. 8, the apparatus 800 for decoding a light field video according to an embodiment of the present invention includes a header decoding unit 810, a displacement calculation unit 820, and a pixel value calculation unit 830.

The header decoding unit 810 acquires, from an encoded bitstream, a distance on the image sensor plane corresponding to each of the unit horizontal interval and the unit vertical interval, which represent the horizontal and vertical intervals between microlenses on the MLA plane.

The displacement calculation unit 820 calculates the integer part and the decimal part of the horizontal and vertical displacements on the MLA plane on the basis of a predetermined precision from the motion vector included in the bitstream.

The pixel value calculation unit 830 calculates the pixel value of the decoding target point on the image sensor plane on the basis of the distance on the image sensor plane and the integer part and the decimal part of the horizontal and vertical displacements.

In another embodiment, the pixel value calculation unit 830 may determine a target position, which is a position corresponding to the decoding target point, on the MLA plane using the integer part and the decimal part of the horizontal and vertical displacements, calculate the pixel value of the decoding target point as the pixel value corresponding to the position of the microlens on the image sensor plane when the target position matches the position of the microlens on the MLA plane, and calculate the pixel value of the decoding target point using a predetermined interpolation filter that uses pixel values on the image sensor plane corresponding to the positions of microlenses adjacent to the target position when the target position does not match the position of the microlens on the MLA plane.

In still another embodiment, the bitstream may include the distance on the image sensor plane, corresponding to each of the unit horizontal interval and the unit vertical interval, in the header at the resolution of the motion vector.

In still another embodiment, the displacement calculation unit 820 may calculate the integer part and the decimal part of the horizontal and vertical displacements when the reference index does not indicate the current picture.

In still another embodiment, the resolution of the difference value of the motion vector may be adaptively set for each CU.

In still another embodiment, whether or not to use the apparatus 800 for decoding a light field video may be determined according to a flag value preset at one of the levels of a NAL unit, a Sequence Parameter Set (SPS), a Picture Parameter Set (PPS), a CU, and a PU.

Although it has been described that plenoptic images and an MLA are used in an embodiment of the present invention, the same encoding/decoding may be performed on other images, in addition to plenoptic images, and the technique of the present invention may be applied even without an MLA.

The explanation described above is only an example of describing the technical spirit of the present invention, and those skilled in the art may make various changes and modifications without departing from the essential characteristics of the present invention. Therefore, the embodiments implemented in the present invention are not intended to limit the technical spirit of the present invention, but rather to explain it, and the scope of the technical spirit of the present invention is not limited by these embodiments. The scope of protection of the present invention should be interpreted by the claims below, and all technical spirits within the equivalent scope should be construed as being included in the scope of rights of the present invention.

What is claimed is:

1. A method of encoding a video, the method comprising:
    calculating a motion vector representing displacement in the video captured by an image sensor;
    calculating a horizontal distance and a vertical distance to indicate a pixel position in the video, where light passing through a main lens and a microlens reaches the image sensor, with reference to a predetermined point in the video; and
    encoding the horizontal distance, the vertical distance, and the motion vector into a bitstream;
    wherein the calculating a motion vector comprises:
        calculating an integer part and a decimal part of a horizontal component and a vertical component of the displacement based on a predetermined precision, and calculating the motion vector based on the integer part and the decimal part, wherein the motion vector corresponds to the displacement when a reference index indicates a picture other than a current picture, and when an Intra Block Copy (IBC) mode is used, the motion vector corresponds to a block vector (BV) corresponding to the displacement.

2. The method according to claim 1, wherein the encoding the horizontal distance, the vertical distance, and the motion vector into a bitstream comprises:

encoding the horizontal distance and the vertical distance by including them in a header of a bitstream.

3. The method according to claim 1, wherein the encoding the horizontal distance, the vertical distance, and the motion vector into a bitstream comprises:

encoding after adaptively setting a resolution of a difference value of the motion vector for each coding unit (CU).

4. The method according to claim 1, wherein the encoding the horizontal distance, the vertical distance, and the motion vector into a bitstream comprises:

setting a flag value in a header of the bitstream to indicate that the method of encoding a video is used.

5. A method of decoding an encoded video, the method comprising:

obtaining a horizontal distance and a vertical distance from an encoded bitstream, the horizontal distance and the vertical distance indicating a pixel position in the video where light passing through a main lens and a microlens reaches the image sensor;

obtaining a motion vector from the encoded bitstream, and calculating an integer part and a decimal part from the obtained motion vector based on a predetermined precision; and calculating a pixel value at a decoding target position in the video, based on the horizontal distance, the vertical distance, the integer part, and the decimal part wherein the motion vector corresponds to a displacement when a reference index indicates a picture other than a current picture, and when an Intra Block Copy (IBC) mode is used, the motion vector corresponds to a block vector (BV) corresponding to the displacement.

6. The method according to claim 5, wherein the calculating a pixel value at a decoding target position in the video comprises:

determining a point corresponding to the pixel position of a decoding target position, using the horizontal distance and the vertical distance; and based on the point, calculating the pixel value at a decoding target position as a pixel value in the video corresponding to a position of a microlens, or calculating the pixel value at a decoding target position by using a predetermined filter applied to pixel values in the video corresponding to positions of microlenses adjacent to the point.

7. The method according to claim 6, wherein the step of calculating the pixel value at a decoding target position by using a predetermined filter comprises:

filtering using pixel values at positions spaced apart as much as a distance on the video corresponding to each of a unit horizontal interval and a unit vertical interval.

8. The method according to claim 5, wherein the bitstream includes the unit horizontal distance and the vertical distance in a header.

9. The method according to claim 5, wherein a resolution of a difference value of the motion vector is adaptively set for each Coding Unit (CU).

10. The method according to claim 5, wherein whether to use the method of decoding an encoded video is determined based on a flag value set in a header of the encoded bitstream.

11. An apparatus for decoding an encoded video, the apparatus comprising:

one or more processors comprising:

a header decoding unit configured to obtain a horizontal distance and a vertical distance from an encoded bitstream, the horizontal distance and the vertical distance indicating a pixel position in the video where light passing through a main lens and a microlens reaches the image sensor;

a displacement calculation unit configured to obtain a motion vector from the encoded bitstream, and calculate an integer part and a decimal part from the obtained motion vector based on a predetermined precision; and a pixel value calculation unit configured to calculate a pixel value at a decoding target position in the video, based on the horizontal distance, the vertical distance, the integer part and the decimal part, wherein the motion vector corresponds to a displacement when a reference index indicates a picture other than a current picture, and when an Intra Block Copy (IBC) mode is used, the motion vector corresponds to a block vector (BV) corresponding to the displacement.

12. The apparatus according to claim 11, wherein the pixel value calculation unit is further configured to:

determines a point corresponding to the pixel position of a decoding target position, using the horizontal distance and the vertical distance, and based on the point, calculate the pixel value at a decoding target position as a pixel value in the video corresponding to a position of microlens, or calculates the pixel value at a decoding target position by using a predetermined filter applied pixel values in the video corresponding to the positions of microlenses adjacent to the point.

13. The apparatus according to claim 11, wherein the encoded bitstream includes the horizontal distance and the vertical distance in a header.

14. The apparatus according to claim 11, wherein a resolution of a difference value of the motion vector is adaptively set for each Coding Unit (CU).

15. The apparatus according to claim 11, wherein whether to use the method of decoding an encoded video is determined based on a flag value set in a header of the encoded bitstream.

* * * * *